J. F. RYAN.
SQUEEZING DEVICE.
APPLICATION FILED DEC. 7, 1915.
1,198,666.
Patented Sept. 19, 1916.
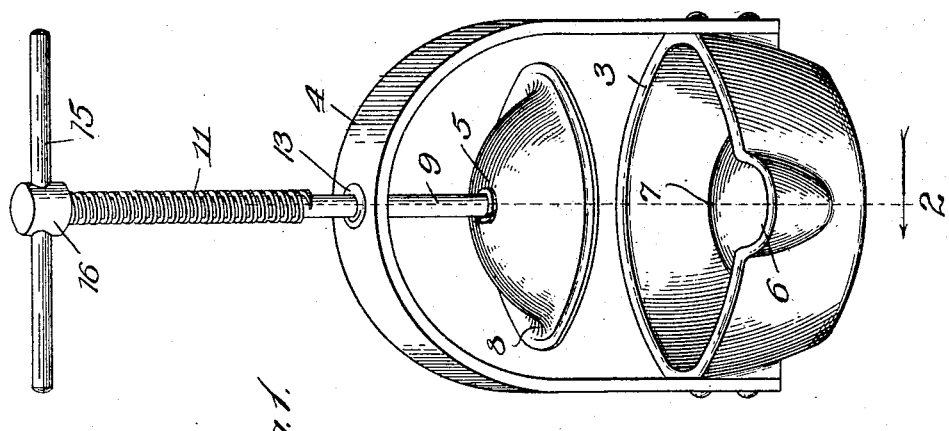
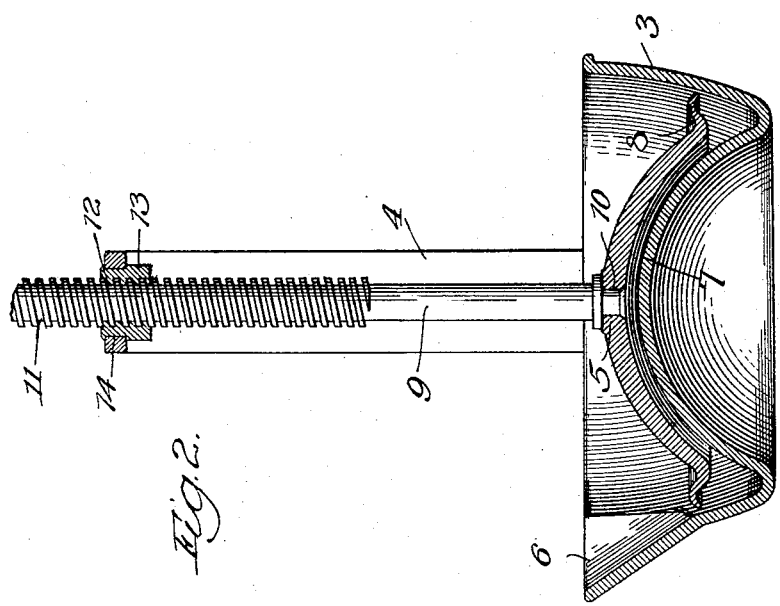
Witnesses:
Inventor:
James F. Ryan

UNITED STATES PATENT OFFICE.

JAMES F. RYAN, OF CHICAGO, ILLINOIS.

SQUEEZING DEVICE.

1,198,666.  Specification of Letters Patent.  Patented Sept. 19, 1916.

Application filed December 7, 1915. Serial No. 65,439.

*To all whom it may concern:*

Be it known that I, JAMES F. RYAN, a citizen of the United States, residing at Room 1842, 332 South Michigan avenue, Chicago, in the county of Cook and State of Illinois, have invented a new and useful Improvement in Squeezing Devices, of which the following is a specification.

My invention relates more particularly to improvement in devices for squeezing the juice from fruit, more particularly oranges, the type of device to which my invention relates comprising, generally stated, a bowl or cup member and a presser or follower member mounted to coöperate with the bowl and squeeze the juice from a piece of fruit positioned between the bowl and the follower.

My improvement generally stated is to provide a novel and simple form of device of the type above referred to which shall operate effectively to squeeze the juice from the fruit and retain in the device, in such position as not to mix with the juice, the seeds and pulp of the fruit.

Referring to the accompanying drawing Figure 1 is a perspective view of my improved device; and Fig. 2 an enlarged section taken at the line 2 on Fig. 1 and viewed in the direction of the arrow, the extreme upper end of the stem forming a portion of the follower being broken away.

The device comprises, generally stated, a bowl or cup member 3 provided with a bail 4 and a follower 5 having screw-threaded connection with the bail to be moved toward and away from the bottom of the bowl, for the purposes hereinafter explained.

The bowl 3 in accordance with the preferred embodiment of my invention is open at its upper end and its sides flare upwardly and downwardly as represented, one of its sides being provided with a spout portion 6. The bottom of the bowl 3 is of spherical contour as represented at 7, it being preferred that the bowl be formed of metal with its bottom wall upwardly offset as indicated to form the spherical portion 7 referred to.

The follower 5 is a general bell shape with its marginal edge reversely curved as represented at 8. A stem 9 which has swivel connection with the bell 8, as indicated at 10, rises from the center of the bell and is equipped toward its upper end with screw-threads 11 which engage corresponding threads 12 in a bushing 13 secured in an opening 14 in the upper portion of the bail 4, the extreme upper end of the stem 9 being provided with any suitable means for rotating it, as for example a cross-piece 15 secured in a head 16 on the upper end of the stem 9.

It will be noted that the threaded portion 11 of the stem 9 reaches short of the bell 5, which is in accordance with the preferred embodiment of my invention and permits the stem 9 with the follower 5 to be raised and depressed without rotating the stem after the latter has been rotated to a position in which the threaded portion 11 of the stem extends wholly above and is disengaged from, the threads 12 of the bail.

In the use of the device the fruit to be squeezed, as for example an orange, is placed between the portion 7 of the bowl and and the underside of the follower 5. The fruit before being introduced into the device as stated is either cut in half or placed in the device without being so cut, in the latter case it being desirable that a portion of the stem-end of the fruit be cut off and slits made in the cut end thereof along intersecting lines. Upon placing the fruit in the device as stated the operator bears down on the stem 9 sliding it in the bail until the threads on the stem engage the threads on the bail whereupon the operator rotates the stem 9 forcing the follower down to approximately the position illustrated in Fig. 2. As the juice is squeezed from the fruit it passes downwardly and around the peripheral edge of the follower 5 and upwardly in the bowl 3. The parts of the device are so constructed that when the follower 5 reaches a position wherein the tendency is to force the pulp and seeds beyond the peripheral edges of the follower 5 and thus upwardly into the upper portion of the bowl 3, the space between the extreme marginal edge of the follower 5 and the opposing interior surface of the side of the bowl 3 is such that the seeds and the major portion of the pulp are intercepted and retained in the bowl below the follower 5 which prevents the seeds and pulp from mixing with the juice extending above the follower 5. Thus the juice squeezed from the fruit may be poured from the bowl through the spout 6 in substantially clear condition. The parts of the device are furthermore so proportioned as shown, that in the final downward movement of the follower 5 the skin and pulp of the fruit will be squeezed substantially free of the juice, thus permitting practically all of the juice to be recovered.

The feature of providing the threads 11 on the upper portion only of the stem 9 is of advantage in that it permits of a quick adjustment of the follower throughout a portion of its movement relative to the bowl 3, the threads 11 coming into play only when the follower 5 is in a position wherein it is desirable to exert thereon the force which is possible by the provision of the threaded connection of the stem with the bell.

While I have illustrated and described a particular embodiment of my invention I do not wish to be understood as intending to limit it thereto, as the same may be variously modified and altered without departing from the spirit of my invention.

What I claim as new and desire to secure by Letters Patent is:—

1. In a device of the character described, the combination of a receptacle having a downwardly and inwardly converging wall, and a follower movable toward and from the bottom of said receptacle, the bottom of said follower and the receptacle being adapted to express the juices from fruit placed between the same, said follower having a marginal flange which gradually approaches the converging wall of the receptacle as the follower descends and into close proximity thereto at the end of its inward movement, for the purpose set forth.

2. In a device of the character described, the combination of a circular receptacle having a downwardly and inwardly converging wall and a bottom of upwardly extending semi-spherical form, and a follower concaved on its under surface and movable toward and away from the bottom of said receptacle, the bottom of said follower and the receptacle being adapted to express the juices from fruit placed between the same, said follower having a marginal flange which gradually approaches the converging wall of the receptacle as the follower descends and into close proximity thereto at the end of its inward movement, for the purpose set forth.

JAMES F. RYAN.

In the presence of—
O. C. AVISUS,
A. C. FISCHER.